United States Patent [19]

Alvarex

[11] 3,728,335
[45] Apr. 17, 1973

[54] METHODS OF PREPARING 21-FLUORO-16,17-ALKYLIDENEDIOXY-3,20-DIKETO-PREGNANES

[75] Inventor: Francisco S. Alvarex, Sunnyvale, Calif.

[73] Assignee: Syntex Corporation, Panama, Panama

[22] Filed: May 26, 1971

[21] Appl. No.: 147,218

[52] U.S. Cl. .........................................260/239.55 D
[51] Int. Cl. ..............................................C07c 173/00
[58] Field of Search ............................260/239.55 D

[56] References Cited

UNITED STATES PATENTS 3,226,383  12/1965  Ringold et al. ............260/239.55 D

*Primary Examiner*—Elbert L. Roberts
*Attorney*—Evelyn K. Merker, Gerard A. Blaufarb and Lawrence S. Squires

[57] ABSTRACT

A fluorination method for preparing 21-fluoro-pregnanes and also methods of preparing $9\alpha,11\beta$-dichloro-$6\alpha,21$-difluoro-$16\alpha,17\alpha$-alkylidenedioxy-pregna-1,4-diene-3,20-dione and $9\alpha,11\beta$-dichloro-$6\alpha,21$-difluoro-$16\alpha,17\alpha$-alkylidenedioxy-pregn-4-ene-3,20-dione derivatives from the corresponding 21-acyloxy-$6\alpha$-fluoro-$16\alpha,17\alpha$-alkylidenedioxy-3,20-diketo-pregnane derivatives. The fluorination process comprises (1) displacement of the corresponding 21-mesyloxy, or 21-tosyloxy, pregnane derivative with bromide ion to yield the corresponding 21-bromo pregnane derivative, and (2) displacement with fluoride ion to effect replacement of the 21-bromo thereby yielding the corresponding 21-fluoro pregnane derivative. A salient feature is the use of a sulfone solvent in the fluoride displacement step, thereby affording improved yields and purer products. The process of preparing $9\alpha,11\beta$-dichloro-$6\alpha,21$-difluoro-$16\alpha,17\alpha$-alkylidenedioxy-3,20-keto-pregna-1,4-diene or -pregn-4-ene derivatives comprises treating the corresponding 21-bromo-$6\alpha$-fluoro-$16\alpha,17\alpha$-alkylidenedioxy-3,20-dione-pregnane derivatives according to the aforementioned displacement process in combination with a subsequent $9\alpha,11\beta$-chlorination process. The aforementioned processes are characterized by high yields and high purity products.

23 Claims, No Drawings

METHODS OF PREPARING 21-FLUORO-16,17-ALKYLIDENEDIOXY-3,20-DIKETO-PREGNANES

BACKGROUND OF THE INVENTION

1. The Invention

This invention relates to methods for effecting the introduction of 21-fluoro groups into pregnane steroids. In a further aspect this invention relates to methods of preparing $9\alpha,11\beta$-dichloro-$6\alpha,21$-difluoro-$16\alpha,17\alpha$-alkylidenedioxy-3,20-diketo-pregna-1,4-diene, and -pregn-4-ene derivatives from the corresponding 21-acyloxy-pregnane derivatives. In a still further aspect this invention relates to the introduction of a bromide at the 21-position, then replacement of the 21-bromo group with a 21-fluoro group.

2. The Prior Art $9\alpha,11\beta$-Dichloro-$6\alpha,21$-difluoro-$16\alpha,17\alpha$-alkylidenedioxy-pregna-1,4-diene-3,20-diones and the corresponding -pregnenes are known compounds having anti-inflammatory activity — note, for example, U.S. Pat. No. 3,409,613. These compounds are typically produced by hydrolysis of the corresponding 21-acetoxy-$6\alpha$-fluoro-$16\alpha,17\alpha$-alkylidenedioxy-pregna-1,4,9(11)-triene (or 4,9(11)-diene) -3,20-dione followed by 21-position tosylation and direct displacement with fluoride ion of the resulting 21-alkyl sulfonate or aryl sulfonate to yield the corresponding 21-fluoro pregnane, note U.S. Pat. Nos. 3,053,838 and 3,409,613. In addition, a subsequent chlorination step is used to introduce the $9\alpha$- and $11\beta$-chloro groups. I have now discovered that by conducting the fluorination treatment in two steps via a 21-bromo intermediate, and by conducting the displacement of the 21-bromo with fluoride ion using tetramethylene sulfone as the solvent, that increased yields and higher purity products are obtained.

SUMMARY OF THE INVENTION

In summary the fluorination process of my invention comprises treating 21-bromo-$6\alpha$-fluoro-20-keto steroids with an alkali metal fluoride salt in the presence of the specific solvent tetramethylene sulfone thereby yielding the corresponding $6\alpha,21$-difluoro-20-keto steroids.

In summary 21-alkyl or acyl sulfonate -20-keto steroids can be converted to the corresponding 21-fluoro steroids, according to my invention, by replacement of the 21-alkyl or acyl sulfonate group with a 21-bromo group and then treating the 21-bromo steroid according to the fluorination process described above.

In summary the process of my invention of preparing $9\alpha,11\beta$-dichloro-$6\alpha,21$-difluoro-$16\alpha,17\alpha$-alkylidenedioxy-pregna-1,4-diene (-pregn-4-ene) -3,20-diones or -pregna-4-ene-3,20-diones comprises the steps of (1) hydrolysis of a 21-acyloxy-$6\alpha$-fluoro-$16\alpha,17\alpha$-alkylidenedioxy-pregna-1,4,9(11)-triene-3,20-dione or -pregna-4,9(11)-diene-3,20-dione starting material or a 21-acycloxy-$6\alpha$-fluoro-$11$-$\beta$-hydroxy-$16\alpha,17\alpha$-alkylidenedioxy-pregna-1,4-diene-3,20-dione or-pregn-4-ene-3,20-dione to yield the corresponding 21-hydroxy intermediate; (2) alkyl sulfonate or aryl sulfonate etherification of the 21-hydroxy intermediate yielding the corresponding 21-alkyl sulfonate or 21-aryl sulfonate intermediate; (3) bromination of the 21-alkyl or aryl sulfonate intermediate to yield the corresponding 21-bromo intermediate; (4) fluorination of the 21-bromo intermediate to yield the corresponding 21-fluoro intermediate; and (5) selective chlorination of the 21-fluoro intermediate to yield the corresponding $9\alpha,11\beta$-dichloro-$6\alpha,21$-difluoro-$16\alpha,17\alpha$-alkylidenedioxy-pregna-1,4-diene-3,20-diene or -pregn-4-ene-3,20-dione derivative.

The invention will be further described hereinbelow.

DESCRIPTION OF THE INVENTION AND PREFERRED EMBODIMENTS

The fluoride replacement process of my invention has general applicability to the replacement of 21-bromo groups of 21-bromo-$6\alpha$-fluoro-20-keto steroids, with 21-fluoro groups and is of particular interest with respect to the preparation of the $6\alpha,21$-difluoro steroids of formula C, below. Accordingly, for purposes of simplicity, the process will be described with respect to the preparation of such compounds, though it should be remembered that the process has general applicability. The fluorination process of my invention can be conveniently schematically represented, using partial pregnane steroidal formulas, by the following overall reaction equation:

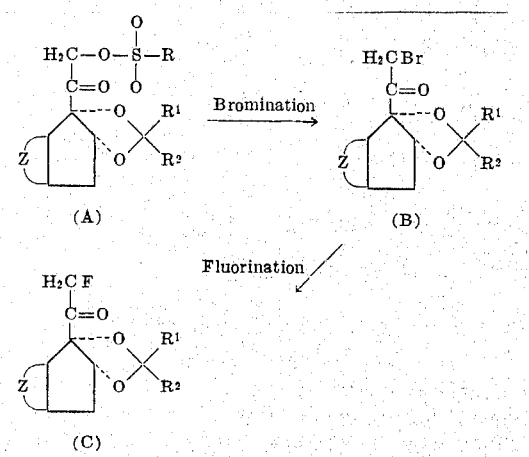

wherein R is lower alkyl or lower aryl; $R^1$ and $R^2$ are independently H or lower alkyl or together with the carbon atom to which they are joined form a cycloalkyl group having five through seven ring carbon atoms; and Z represents a pregnane ABC ring nucleus having the formula

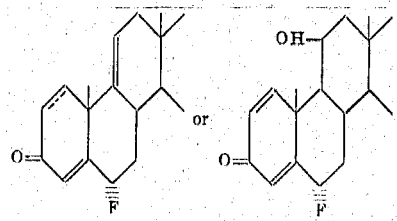

wherein the dotted 1-2 bond line indicates either a carbon-carbon single bond or a carbon-carbon double bond.

The bromination step can be conveniently effected by treating the pregnane starting material (formula A) with an alkali metal bromide salt in the presence of a suitable inert organic solvent. Typically, the treatment is conducted at temperatures in the range of about from 60° to 110° C for about from 6 to 24 hours using reactant mole ratios in the range of about from 1 to 10 moles of bromide salt per mole of pregnane starting material, and preferably about from 2 to 3 moles of bromide salt per mole of pregnane starting material.

However, temperatures, treatment durations and mole ratios both above and below these can also be used. Best results are obtained by conducting the treatment at reflux and preferably under anhydrous conditions. Suitable alkali metal bromide salts which can be used include, for example, lithium bromide, sodium bromide, potassium bromide, and the like. Suitable inert organic solvents which can be used include, for example, acetone, tetramethylene sulfone, dimethyl-sulfoxide, dimethyl acetamide, dimethylformamide, and the like. We have further found that best results are obtained by using lithium bromide with tetramethylene sulfone.

The fluorination step is conducted according to my invention by treating the 21-bromo intermediate (formula B) with a suitable alkali metal fluoride salt in the presence of the solvent tetramethylene sulfone. Typically, the treatment is conducted at temperatures in the range of about from 100° to 135° C, and preferably about from 125° to 135° C for about from 12 to 48 hours and preferably about from 20 to 24 hours using reactant mole ratios in the range of about from 2 to 10 moles of fluoride salt per mole of pregnane starting material (i.e., formula B) and preferably about from 2 to 3 moles of fluoride salt per mole of pregnane starting material. However, temperatures, treatment durations, and mole ratios both above and below these can also be used. Best results are obtained by conducting the treatment at temperatures in the range of about from 130° to 135° C and preferably the treatment is conducted under anhydrous conditions. Suitable alkali metal fluoride salts which can be used include, for example, potassium fluoride, cesium fluoride, and rubidium fluoride. Best results are obtained with potassium fluoride. A salient feature of this step is the use of tetramethylene sulfone and its selectivity to the alkali metal fluoride salts listed above. I have discovered that by the use of the particular solvent and these alkali metal fluoride salts that yields are greatly enhanced and much purer products are obtained. Typically a tetramethylene sulfone steroid ratio in the range of about from 3 to 10 ml. of tetramethylene sulfone per gram of steroid is used. Best results are obtained by using a ratio of about 3 ml. of tetramethylene sulfone per gram of steroid.

The process of my invention of preparing 9α,11β-dichloro-6α,21-difluoro-16α,17α-alkylidenedioxy-pregna-1,4-diene-3,20-dione derivatives and 9α,11β-dichloro-6α,21-difluoro-16α,17α-alkylidenedioxy-pregn-4-ene-3,20-dione derivatives can be conveniently represented by the following schematic overall reaction equation:

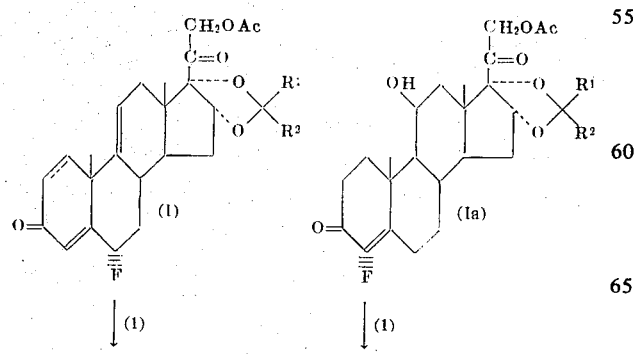

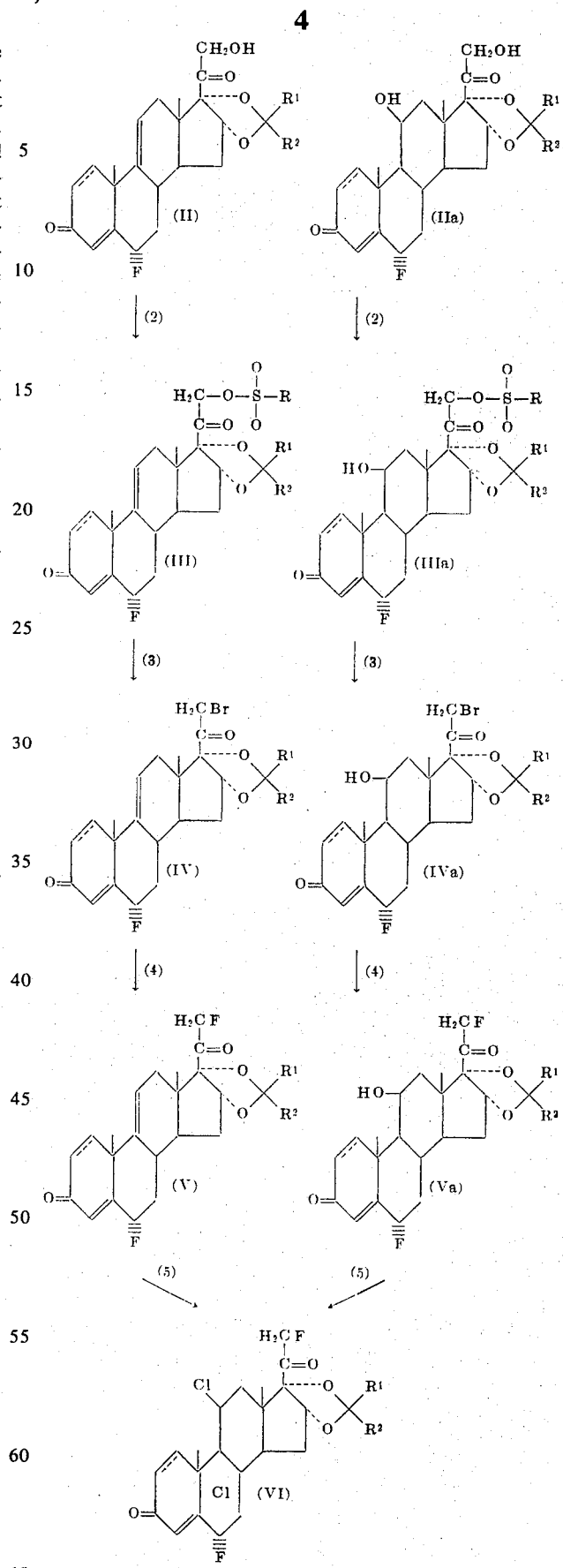

wherein Ac is acyl having from two to 12 carbon atoms; R is hydrogen or lower alkyls having from one through seven carbon atoms, $R^1$ and $R^2$ are independently hydrogen or lower alkyls having from one through seven carbon atoms, or together with the carbon atom to which they are joined form a cycloalkyl group having five through seven ring carbon atoms, and the dotted bond line indicates a single or double bond, and preferably $R^1$ and $R^2$ are each methyl and the dotted line is a double bond.

Starting with the corresponding 21-acyloxy (typically a 21-acetoxy) starting material of formula I, the 21-acetyl group is removed by hydrolysis, step 1 of my invention. This can be effected by any suitable hydrolysis procedure and can, for example, be conveniently effected by treating the compound of formula I or Ia with a suitable alkyl alcohol containing a small amount of potassium carbonate. This treatment is typically conducted at temperatures in the range of about from 0° to 100° C. Suitable alkyl alcohols include, for example, methanol, ethanol, and the like. Also, in place of potassium carbonate, the following reagents could be used, sodium carbonate, and the like. The hydrolysis step is a conventional procedure as thus optimum conditions can be obtained by routine experimentation, or alternatively, other equivalent hydrolysis procedures can be used such as those described in U.S. Pat. No. 3,409,613 (Example I (A)). The compounds of formula III or IIIa are respectively prepared by treating the corresponding compounds of formula II or IIa with mesyl chloride or tosyl chloride in a suitable inert organic solvent, thereby yielding the corresponding 21-mesyloxy or 21-tosyloxy derivative. Typically, this treatment is conducted at temperatures in the range of about from 0° to 50° C for about from 1 to 12 hours using reactant mole ratios in the range of about from 1 to 10 moles of mesyl chloride or tosyl chloride per mole of pregnane starting material of formula II or IIa. However, temperatures, treatment durations and mole ratios both above and below these ranges can also be used. Suitable inert organic solvents which can be used include, for example, pyridine, collidine, and the like. Also, in place of mesyl chloride or tosyl chloride, other lower alkyl sulfonyl chlorides or lower aryl sulfonyl chlorides could be used, however, best results are obtained by using either mesyl chloride or tosyl chloride, and preferably using mesyl chloride.

Steps 3 and 4 correspond to the bromide replacement and fluoride replacement steps, respectively, of my invention, and are conducted in the same manner, as described hereinabove.

Step 5, the chlorination step, can be performed according to any suitable chlorination procedure. The compounds of formula V can, for example, be conveniently chlorinated to the corresponding compounds of formula VI via treatment with gaseous chlorine in a suitable inert organic solvent. Preferably this treatment is conducted under anhydrous conditions. Also, as the chlorination step is a conventional procedure, optimum conditions can be obtained by nominal routine experimentation. The compounds of formula Va can be conveniently chlorinated to afford the compounds of formula VI, according to the chlorination process described in my Belgium Patent 744,618, issued Mar. 31, 1970, via treatment with thionyl chloride and chlorine. This treatment is typically conducted in a liquid reaction media and in the presence of a tertiary amine, at temperatures in the range of about −10° to 30° C for about from 1 to 45 minutes. Suitable inert liquid reaction media include, for example, dimethylsulfoxide, acetic acid, methylene chloride, tetrahydrofuran, and the like. Typically about from 0.9 to 5 moles of thionyl chloride and also about from 0.9 to 5 moles of chlorine, and about from 1 to 10 moles of tertiary amine per mole of compound of formula Va are used. However, temperatures, treatment times, and mole ratios both above and below these can also be used.

Preferably, each of the respective intermediate products formed by the above reaction steps is isolated prior to its use as the starting materials for the next succeeding step. Separation and isolation of the intermediates and products can be effected by any suitable separation or purification procedure such as, for example, extraction, filtration, evaporation, crystallization, and thin-layer chromatography. Specific illustrations of typical separation and isolation procedures can be had by reference to the examples described hereinbelow. However, other equivalent separation or isolation procedures could, of course, also be used.

As described hereinabove and below, the following terms have the following meanings. The term lower alkyl refers to both straight chain and branched chain alkyl groups having from one through seven carbon atoms. The term lower aryl refers to aryl groups having one or two lower alkyl substituents such as, for example, p-toluene or o-methyl-p-toluene. The term acyl refers to acyl groups having from two through 12 carbon atoms. Typical acyl groups include, for example, acetyl, propionyl, butyryl, valeryl, isovaleryl, hexanoyl, heptanoyl, octanoyl, nonanoyl, undecanoyl, lauroyl, benzoyl, p-methoxy-benzoyl, p-nitrobenzoyl, phenylacetyl, phenylpropionyl, o-, m-, p-methylbenzoyl, $\beta$-cyclopentylpropionyl, dihydrocinnanyl and the like.

A further understanding of the invention can be obtained from the following illustrative non-limiting examples.

EXAMPLE 1

This example illustrates hydrolysis of the acetoxy group at the 21-position to yield the corresponding 21-hydroxy-pregnane. In this example 157 grams of 21-acetoxy-6α-fluoro-16α,17α-isopropylidenedioxy-pregna-1,4,9(11)-triene-3,20-dione is suspended in 3,000 ml. of anhydrous methanol. Six grams of finely divided potassium carbonate is then added under a nitrogen atmosphere and the mixture is stirred under a nitrogen atmosphere, at room temperature (i.e., about 20° C), for 3 hours. The mixture is then neutralized by the addition of 15 ml. of glacial acetic acid and then concentrated under vacuum to a small volume (i.e., about 300 ml.) and then diluted by the slow addition of 5 liters of water. The resulting crystalline precipitate is collected by filtration and dried under vacuum at 50° to 60° C, affording 6α-fluoro-21-hydroxy-16α,17α-isopropylidenedioxy-pregna-1,4,9-(11)-triene-3,20-dione.

By following the same procedure as above but using the corresponding pregnane derivative as a starting material, the following are respectively prepared:

6α-fluoro-21-hydroxy-16α,17α-methylidenedioxy-pregna-1,4,9-(11)-triene-3,20-dione;

6α-fluoro-21-hydroxy-16α,17α-cyclopentylidenedioxy-pregna-1,4,9-(11)-triene-3,20-dione;

6α-fluoro-16α,17α-cyclohexylidenedioxy-21-hydroxy-pregna-1,4,9-(11)-triene-3,20-dione;

21-acetoxy-6α-fluoro-16α,17α-methylidenedioxy-pregna-4,9(11)-diene-3,20-dione;

6α-fluoro-21-hydroxy-16α,17α-isopropylidenedioxy-pregna-4,9(11)-diene-3,20-dione;

6α-fluoro-21-hydroxy-16α,17α-cyclopentylidenedioxy-pregna-4,9(11)-diene-3,20-dione;

6α-fluoro-16α,17α-cyclohexylidenedioxy-21-hydroxy-pregna-4,9(11)-diene-3,20-dione;

6α-fluoro-9β,21-dihydroxy-16α,17α-methylidenedioxy-pregna-1,4diene-3,20-dione;

6α-fluoro-9β,21-dihydroxy-16α,17α-isopropylidenedioxy-pregna-1,4-diene-3,20-dione;

6α-fluoro-9β,21-dihydroxy-16α,17α-cyclopentylidenedioxy-pregna-1,4-diene-3,20-dione;

6α-fluoro-16α,17α-cyclohexylidenedioxy-9β,21-dihydroxy-pregna-1,4-diene-3,20-dione;

6α-fluoro-9β,21-dihydroxy-16α,17α-methylidenedioxy-pregn-4-ene-3,20-dione;

6α-fluoro-9β,21-dihydroxy-16α,17α-isopropylidenedioxy-pregn-4-ene-3,20-dione;

6α-fluoro-9β,21-dihydroxy-16α,17α-cyclopentylidenedioxy-pregn-4-ene-3,20-dione; and 6α-fluoro-16α,17α-cyclohexylidenedioxy-9β,21-dihydroxy-pregn-4-ene-3,20-dione.

EXAMPLE 2

This example illustrates mesylation of the 21-hydroxy group to yield the corresponding 21-mesyloxy-pregnanes. In this example 136 g. of 6α-fluoro-21-hydroxy-16α,17α-isopropyl-idenedioxy-pregna-1,4,9(11)-triene-3,20-dione is dissolved in 1,360 ml. of anhydrous pyridine and the resulting mixture then cooled to about 0° to 5° C. 95 Ml. of mesyl chloride is then slowly added and the resulting mixture stirred under anhydrous conditions at 0° to 5° C for 2 hours. The reaction mixture is then diluted slowly with 10 l. of water, resulting in a crystalline precipitate which is then collected by filtration and dried at 40° to 50° C, under vacuum, affording 6α-fluoro-21-mesyloxy-16α,17α1,4,9(11)-triene-3,20-dione.

By following the same procedure as above but using the corresponding pregnane derivative as a starting material, the following are respectively prepared:

6α-fluoro-16α,17α-methylidenedioxy-21-mesyloxy-pregna-1,4,9(11)-triene-3,20-dione;

6α-fluoro-21-mesyloxy-16α,17α-cyclopentylidenedioxy-pregna-1,4,9(11)-triene-3,20-dione;

6α-fluoro-16α,17α-cyclohexylidenedioxy-21-mesyloxy-pregna-1,4,9(11)-triene-3,20-dione;

21-acetoxy-6α-fluoro-16α,17α-methylidenedioxy-pregna-4,9(11)-diene-3,20-dione;

6α-fluoro-16α,17α-isopropylidenedioxy-21-mesyloxy-pregna-4,9(11)-diene-3,20-dione;

6α-fluoro-21-mesyloxy-16α,17α-cyclopentylidenedioxy-pregna-4,9(11)-diene-3,20-dione;

6α-fluoro-16α,17α-cyclohexylidenedioxy-21-mesyloxy-pregna-4,9(11)-diene-3,20-dione;

6α-fluoro-9β,21-dihydroxy-mesyloxy-16α,17α-methylidene-dioxy-pregna-1,4-diene-3,20-dione;

6α-fluoro-9β-hydroxy-16α,17α-isopropylidenedioxy-21-mesyloxy-pregna-1,4-diene-3,20-dione;

6α-fluoro-9β-hydroxy-21-mesyloxy-16α,17α-cyclopentylidenedioxy-pregna-1,4-diene-3,20-dione;

6α-fluoro-16α,17α-cyclohexylidenedioxy-9β-hydroxy-21-mesyloxy-pregna-1,4-diene-3,20-dione;

6α-fluoro-9β-hydroxy-21-mesyloxy-16α,17α-methylidene-dioxy-pregn-4-ene-3,20-dione;

6α-fluoro-16α,17α-isopropylidenedioxy-9β-hydroxy-21-mesyloxy-pregn-4-ene-3,20-dione;

6α-fluoro-9β-hydroxy-21-mesyloxy-16α,17α-cyclopentylidenedioxy-pregn-4-ene-3,20-dione; and 6α-fluoro-9β-hydroxy-16α,17α-cyclohexylidenedioxy-21-mesyloxy-pregn-4-ene-3,20-dione.

EXAMPLE 3

This example illustrates bromination of the 21-mesyloxy group to the corresponding 21-bromo pregnanes. In this example 156 grams of 6α-fluoro-21-hydroxy-16α,17α-isopropylidenedioxy-pregna-1,4,9(11)-triene-3,20-dione-21-mesylate is dissolved in 1,000 ml. of acetone containing 100 g. of lithium bromide. The mixture is stirred and refluxed under anhydrous conditions for 8 hours. The reaction mixture is then diluted by the slow addition of 600 ml. of water and then evaporated under reduced pressure to remove the acetone. The concentrated mixture is then further diluted by the addition of 7 liters of water resulting in the formation of a precipitate which is then collected by filtration and dried at 40° to 50° C, under vacuum, affording 21-bromo-6α-fluoro-16α,17α-isopropylidenedioxy-pregna-1,4,9(11)-triene-3,20-dione.

By following the same procedure as above but using the corresponding pregnane derivative as a starting material, the following compounds are respectively prepared:

21-bromo-6α-fluoro-16α,17α-methylidenedioxy-pregna-1,4,9(11)-triene-3,20-dione;

21-bromo-6α-fluoro-16α,17α-cyclopentylidenedioxy-pregna-1,4,9(11)-triene-3,20-dione;

21-bromo-6α-fluoro-16α,17α-cyclohexylidenedioxy-pregna-1,4,9(11)-triene-3,20-dione;

21-bromo-6α-fluoro-16α,17α-methylidenedioxy-pregna-4,9(11)-diene-3,20-dione;

21-bromo-6α-fluoro-16α,17α-isopropylidenedioxy-pregna-4,9(11)-diene-3,20-dione;

21-bromo-6α-fluoro-16α,17α-cyclopentylidenedioxy-pregna-4,9(11)-diene-3,20-dione;

21-bromo-6α-fluoro-16α,17α-cyclohexylidenedioxy-pregna-4,9(11)-diene-3,20-dione;

21-bromo-6α-fluoro-9β-hydroxy-16α,17α-methylidenedioxy-pregna-1,4-diene-3,20-dione;

21-bromo-6α-fluoro-9β-hydroxy-16α,17α-isopropylidene-dioxy-pregna-1,4-diene-3,20-dione;

21-6α-fluoro-16α,17α-cyclopentylidenedioxy-9β-hydroxy-pregna-1,4-diene-3,20-dione;

21-bromo-6α-fluoro-16α,17α-cyclohexylidenedioxy-9β-hydroxy-pregna-1,4-diene-3,20-dione;

21-bromo-6α-fluoro-9β-hydroxy-16α,17α-methylidenedioxy-pregn-4-ene-3,20-dione;

21-bromo-6α-fluoro-9β-hydroxy-16α,17α-isopropylidene-dioxy-pregn-4-ene-3,20-dione;

21-bromo-16α,17α-cyclopentylidenedioxy-6α-fluoro-9β-hydroxy-pregn-4-ene-3,20-dione; and 21-bromo-16α,17α-cyclohexylidenedioxy-6α-fluoro-9β-hydroxy-pregn-4-ene-3,20-dione.

EXAMPLE 4

This example illustrates fluorination replacement of the 21-bromo group to yield the corresponding 21-fluoro-pregnanes. In this example, 50 grams of anhydrous potassium fluoride is added to 45 g. of 21-bromo-6α-fluoro-16α,17α -isopropylidenedioxy-pregna-1,4,9(11)-triene-3,20-dione in 150 ml. of tetramethylene sulfone with constant stirring. The mixture is heated to 110° C and maintained at this temperature for 14 hours with constant stirring. The temperature of the reaction mixture is then raised to 140° C and maintained at this temperature for 9 hours and then lowered to a temperature of about from 110° to 115° C and maintained at this temperature for 12 hours. The reaction mixture is then cooled and poured into 3 liters of cold water, resulting in the formation of a crude 6α,21-difluoro-16α,17α-methylidenedioxy-pregna-1,4,9(11)-triene-3,20-dione precipitate which is collected by filtration and dried under a vacuum mat at 60° C. The resulting crude residue is dissolved in 250 ml. of methylene chloride, then diluted by the slow addition of 850 ml. of hexane, with constant stirring, and then filtered. The resulting product-rich filtrate is collected. The filter cake is redissolved in 200 ml. of methylene dichloride and reprecipitated with 850 ml. of hexane and then filtered. This procedure is repeated two more times with the filtrate being retained in each case. All of the filtrates are then combined. Powdered activated charcoal is added to the combined filtrates resulting in a suspension which is then filtered over Celite to remove the charcoal and adsorbed impurities. The resulting filtrate is evaporated to dryness under vacuum resulting in a crystalline product which is further purified by recrystallization using a methylene chloride-ethyl acetate solvent. A small quantity of additional 6α,21-difluoro-16α,17α-isopropylidenedioxy-pregna-1,4,9(11)-triene-3,20-dione product is obtained by washing the recovered activated charcoal with methylene chloride. The washings are combined and then evaporated to dryness. The resulting residue is dissolved in a 4:1, by volume, mixture of hexane and methylene chloride, and then filtered through a column of neutral alumina. The column is washed twice with 100 ml. portions of the same solvent mixture. The washings are combined with the initial eluates and then evaporated to dryness under reduced pressure. The dried residue is then further purified by recrystallization from methylene chloride-ethylene acetate affording an additional quantity of product.

By following the same procedure as above but using the corresponding pregnane derivative as a starting material, the following are respectively prepared:

6α,21-difluoro-16α,17α-methylidenedioxy-pregna-1,4,9(11)-triene-3,20-dione;

6α,21-difluoro-16α,17α-cyclopentylidenedioxy-pregna-1,4,9(11)-triene-3,20-dione;

6α,21-difluoro-16α,17α-cyclohexylidenedioxy-pregna-1,4,9(11)-triene-3,20-dione;

6α,21-difluoro-16α,17α-methylidenedioxy-pregna-4,9(11)-diene-3,20-dione;

6α,21-difluoro-16α,17α-isopropylidenedioxy-pregna-4,9(11)-diene-3,20-dione;

6α,21-difluoro-16α,17α-cyclopentylidenedioxy-pregna-4,9(11)-diene-3,20-dione;

6α,21-difluoro-16α,17α-cyclohexylidenedioxy-pregna-4,9(11)-diene-3,20-dione;

6α,21-difluoro-9β-hydroxy-16α,17α-methylidenedioxy-pregna-1,4-diene-3,2-dione;

6α,21-difluoro-9β-hydroxy-16α,17αisopropylidenedioxy-pregna-1,4-diene-3,20-dione;

6α-difluoro-16α,17α-cyclopentylidenedioxy-9β-hydroxy-pregna-1,4-diene-3,20-dione;

6α,21-difluoro-16α,17-60 -cyclohexylidenedioxy-9β-hydroxy-pregna-1,4-diene-3,20-dione;

6α,21-difluoro-9β-hydroxy-16α,17α-methylidenedioxy-pregny4-ene-3,20-dione;

6α,21-difluoro-9β-hydroxy-16α,17α-isopropylidenedioxy-pregn-4-ene-3,20-dione;

16α,17α-cyclopentylidenedioxy-6α,21-difluoro-9β-hydroxy-pregn-4-ene-3,20-dione; and 6α,21-difluoro-16α,17α-cyclohexylidenedioxy-9β-hydroxy-pregn-4-ene-3,20-dione.

EXAMPLE 5

This example illustrates chlorination at the 9α,11β-position of 6α,21-difluoro-9(11)-ene pregnanes to afford the corresponding 9α,11β-dichloro-pregnane compounds. In this example 17.7 g. of 6α,21-difluoro-16α,17α-isopropylidenedioxy-pregna-1,4,9(11)-triene-3,20-dione is dissolved in a mixture of 265 ml. of anhydrous chloroform and 35 ml. of pyridine. The mixture is then treated with a slow stream of dry chlorine under anhydrous conditions with constant stirring, until analysis by thin-layer chromatography of respective samples taken at sequential time intervals reveals the completion of the reaction. The reaction mixture is then evaporated under vacuum at about 35°–40° C to a volume of 65 ml. 150 Ml. of ethyl acetate are added to the mixture and the mixture again evaporated under vacuum at 35°–40° C to remove the chloroform and most of the pyridine. The mixture is then cooled to room temperature (i.e., about 20° C) affording a crude precipitate of 9α,11β-dichloro-6α,21-difluoro-16α,17α-isopropylidenedioxy-pregna-1,4-diene-3,20-dione which is then recovered by filtration, dried and further purified by recrystallization, first using a methylene chloride-ethyl acetate solvent and then using a pure methylene chloride solvent.

By following the same procedure as above but using the corresponding pregnane derivative as a starting material, the following are respective prepared:

9α,11β-dichloro-6α,21-difluoro-16α,17α-methylidenedioxy-pregna-1,4-diene-3,20-dione;

9α,11β-dichloro-6α,21-difluoro-16α,17α-cyclopentylidene-dioxy-pregna-1,4-diene-3,20-dione;

9α,11β-dichloro-6α,21-difluoro-16α,17α-cyclohexylidene-dioxy-pregna-1,4-diene-3,20-dione;

9α,11β-dichloro-6α,21-difluoro-16α,17α-methylidene-dioxy-pregn-4-ene-3,20-dione;

9α,11β-dichloro-6α,21-difluoro-16α,17α-isopropylidene-dioxy-pregn-4-ene-3,20-dione;

9α,11β-dichloro-6α,21-difluoro-16α,17α-cyclopentylidene-dioxy-pregn-4-ene-3,20-dione; and 9α,11β-dichloro-6α,21 -difluoro-16α,17α-cyclohexylidene-dioxy-pregn-4-ene-3,20-dione.

EXAMPLE 6

This example illustrates methods of preparing 9α,11β-dichloro-6α,21-difluoro-pregnanes from the corresponding 6α,21-difluoro-11β-hydroxy pregnanes. In this example 1 molar equivalent of thionyl chloride and 1 molar equivalent of chlorine are dispersed in 1 liter of chloroform at room temperature (about 20° C). Ten ml. of 6α,21-difluoro-11β-hydroxy-16α,17α- isopropylidenedioxy-pregna-1,4-diene-3,20-dione is dispersed in 100 ml. of chloroform containing 10 ml. of triethyl amine at room temperature. Ten milliliters of the thionyl chloride, chlorine, chloroform mixture, prepared above, is then added dropwise to the resulting pregnane, chloroform, triethyl amine mixture, with constant stirring, at room temperature. The resulting reaction mixture is cooled to 0° C and maintained at this temperature for 1 hour with constant stirring. The mixture is then washed with dilute hydrochloric acid and then repeatedly washed with water to neutrality. The mixture is then dried over a sodium sulfate and evaporated affording a residue of 9α,11β-dichloro-6α,21-difluoro-16α,17α-isopropylidenedioxy-pregna-1,4-diene-3,20-dione which is then further purified by recrystallization from acetone/hexane.

By following the same procedure as above but using the corresponding 6α,21-difluoro-11β-hydroxy-pregnane starting materials, the following compounds are respectively prepared:

9α,11β-dichloro-6α,21-difluoro-16α,17α-methylidenedioxy-pregna-1,4-diene-3,20-dione;

9α,11β-dichloro-6α,21-difluoro-16α,17α-cyclopentylidene-dioxy-pregna-1,4-diene-3,20-dione;

9α,11η-dichloro-16α,17α-cyclohexylidenedioxy-6α,21-difluoro-pregna-1,4-diene,-3,20-dione;

9α,11β-dichloro-6α,21-difluoro-16α,17α-methylidene-dioxy-pregn-4-ene-3,20-dione;

9α,11β-dichloro-6α,21-difluoro-16α,17α-isopropylidene-dioxy-pregn-4-ene-3,20-dione;

9α,11β-dichloro-16α,17α-cyclopentylidenedioxy-6α,21-difluoro-pregn-4-ene-3,20-dione; and 9α,11β-dichloro-16α,17α-cyclohexylidenedioxy-6α,21-difluoro-pregn-4-ene-3,20-dione.

Obviously many modifications and variations of the invention, described hereinabove and in the appended claims, can be made without departing from the essence and scope thereof.

What is claimed is:

1. A method of preparing 6α,21-difluoro-20-keto-pregnane steroid which comprises treating the corresponding 21-bromo-6α-fluoro-20-keto pregnane steroid selected from the group having the formulas:

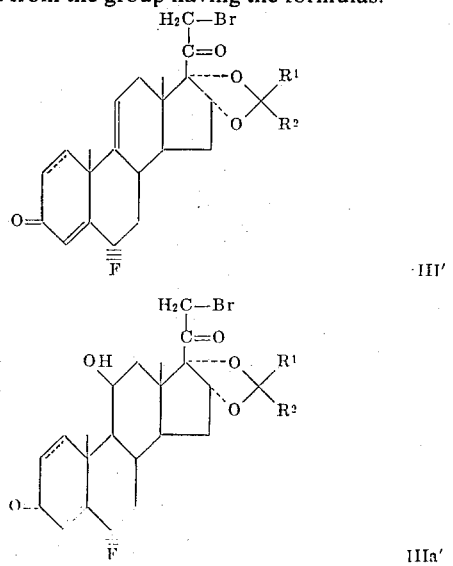

wherein $R^1$ and $R^2$ are independently selected from the group consisting of hydrogen and lower alkyls having from one through seven carbon atoms or together with the carbon atom to which they are joined form a cycloalkyl group having from five through seven ring carbon atoms, and the dotted line means that the bond joining the $C_1$ and $C_2$ carbon atoms can be either a single or double bond; with an alkali metal fluoride salt selected from the group consisting of potassium fluoride, cesium fluoride, rubidium fluoride, under reactive conditions, in tetramethylene sulfone.

2. The process of claim 1 wherein said treatment is conducted at temperatures in the range of about from 130° to 135° C.

3. The process of claim 1 wherein a volume/weight ratio of tetramethylene sulfone to steroid in the range of about from 3 to 10 ml. of tetramethylene sulfone per gram of said steroid is used.

4. The process of claim 1 wherein a mole ratio of alkali metal fluoride salt to moles of 21-bromo-6α-fluoro-20-keto-pregnane steroid, in the range of about from 2 to 10 is used.

5. The process of claim 1 wherein said alkali metal fluoride is potassium fluoride.

6. The process of claim 1 wherein $R^1$ and $R^2$ are each methyl and the bond joining the $C_1$ and $C_2$ atoms is a double bond.

7. The process of claim 3 wherein said treatment is conducted at temperatures in the range of about from 100° to 135° C and a mole ratio of alkali metal fluoride salt to moles of 21-bromo-6α-fluoro- steroid in the range of about from 2 to 10 is used and wherein said alkali metal fluoride salt is potassium fluoride.

8. The process of claim 1 wherein said treatment is conducted at temperatures in the range of about from 100° to 135° C and a mole ratio of alkali metal fluoride salt to moles of 21-bromo-6α-fluoro- steroid in the range of about from 2 to 10 is used and wherein said alkali metal fluoride salt is potassium fluoride.

9. The process of claim 7 wherein said treatment is conducted at temperatures in the range of about from 130° to 135° C.

10. The process of claim 8 wherein said treatment is conducted at temperatures in the range of about from 130° to 135° C.

11. A method of preparing 6α,21-difluoro pregnane steroids which comprises the steps of:

a. treating a 60α-fluoro steroid selected from the group having the formulas:

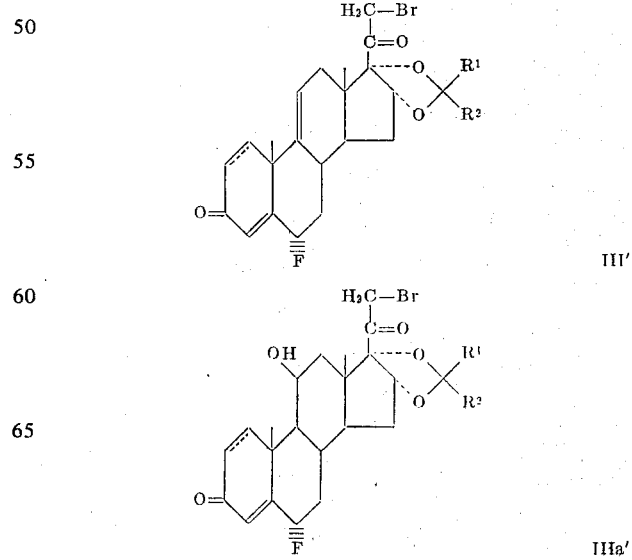

wherein R'' is mesyloxy or tosyloxy, and R¹ and R² are independently selected from the group consisting of hydrogen and lower alkyls having from one through seven carbon atoms or together with the carbon atom to which they are joined form a cycloalkyl group having from five through seven ring carbon atoms, and the dotted line means that the bond joining the $C_1$ and $C_2$ carbon atoms can be either a single or double bond, with an alkali metal bromide salt, under reactive conditions thereby forming the corresponding 21-bromo derivative; and b. treating the 21-bromo derivative product of step (a) with an alkali metal fluoride salt selected from the group consisting of potassium fluoride, cesium fluoride and rubidium fluoride under reactive conditions in tetramethylene sulfone, thereby forming the corresponding 6α,21-difluoro pregnane steroid.

12. The process of claim 11, wherein R¹ and R² are each methyl and the bond joining the $C_1$ and $C_2$ carbon atom is a double bond.

13. The process of claim 11 wherein step (b) is conducted using a volume/weight ratio of tetramethylene sulfone to steroid in the range of about from 3 to 10 ml. of tetramethylene sulfone per gram of steroid.

14. The process of claim 13 wherein step (b) is conducted using a mole ratio of alkali metal fluoride salt to moles of 21-bromo-6α-fluoro steroid, in the range of about from 2 to 10 is used.

15. The process of claim 14 wherein said alkali metal fluoride salt is potassium fluoride.

16. The process of claim 15 wherein step (b) is conducted at temperatures in the range of about from 130° to 135°C.

17. The process of claim 11 wherein step (a) is conducted in the presence of an inert organic solvent.

18. The process of claim 17 wherein said alkali metal bromide salt is lithium bromide and said inert organic solvent is tetramethylene sulfone.

19. The process of claim 11 wherein said alkali metal fluoride salt is potassium fluoride.

20. A method according to claim 11 of preparing 6α,21-difluoro pregnane steroid having the formula:

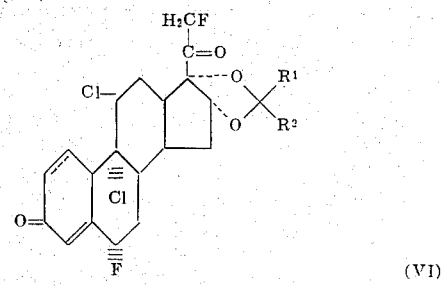

wherein R¹, R² and the dotted bond line are as defined in claim 14,
wherein said 6α-fluoro steroid starting material has the formula:

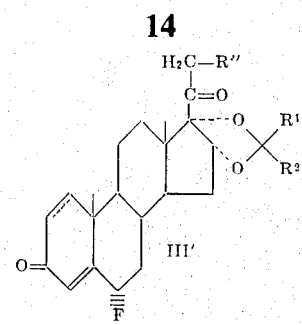

wherein R'', R¹, R² and the dotted bond line are as defined in claim 14,
and where said corresponding 6α,21-difluoro steroid of step (b) is treated with anhydrous chlorine under reactive conditions in an inert organic solvent, thereby forming the corresponding compound of formula VI.

21. A method according to claim 20 wherein R¹ and R² are each methyl and the bond joining the $C_1$ and $C_2$ carbon atoms is a double bond.

22. A method according to claim 11 of preparing 6α,21-difluoro pregnane steroids having the formula:

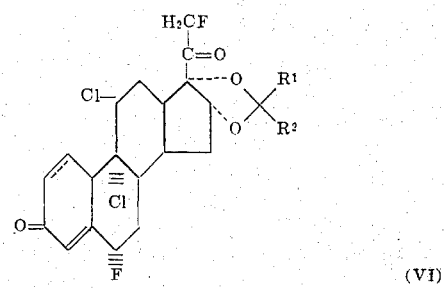

wherein R¹, R² and the dotted bond line are as defined in claim 14,
wherein said 6α-fluoro pregnane steroid starting material has the formula:

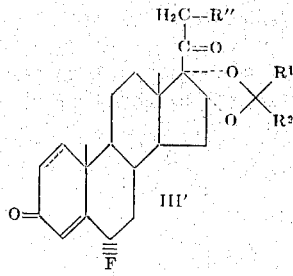

wherein R''R¹, R² and the dotted bone line are as defined in claim 14,
and wherein said corresponding 6α,21-difluoro steroid of step (b) is treated with thionyl chloride and chlorine, under reactive conditions, thereby forming the corresponding compound of formula VI.

23. The method of claim 22, wherein R¹ and R² are each methyl and the bond line joining the $C_1$ and $C_2$ carbon atoms is a double bond.

* * * * *

UNITED STATES PATENT OFFICE
CERTIFICATE OF CORRECTION

Patent No. 3,728,335     Dated April 17, 1973

Inventor(s) Francisco S. Alvarez     (Page 1)

It is certified that error appears in the above-identified patent and that said Letters Patent are hereby corrected as shown below:

Column 1, line 59, "21-acycloxy" should read -- 21-acyloxy--.
Column 1, line 59, "11-β-" should read -- 11β- --. Column 2, line 5, "3,20-diene" should read -- 3,20-dione --. Column 2, lines 50-55, that portion of the right hand formula reading:

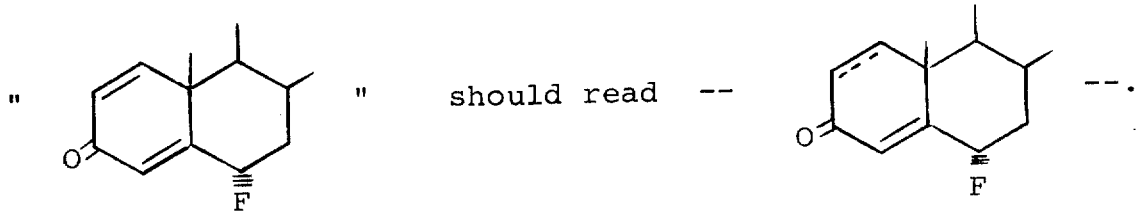

Column 3, lines 60-65, that portion of formula (Ia) reading:

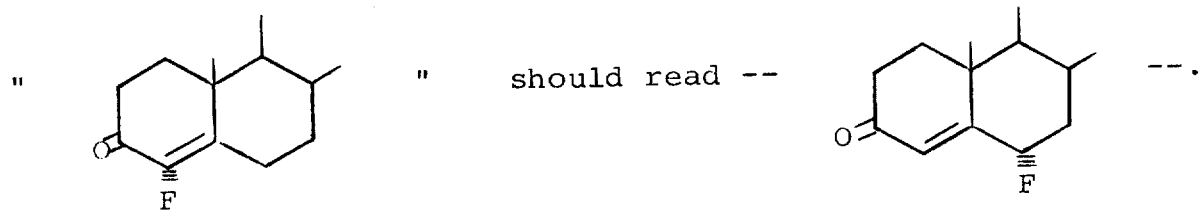

Column 4, lines 60-65, that portion of formula (VI) reading:

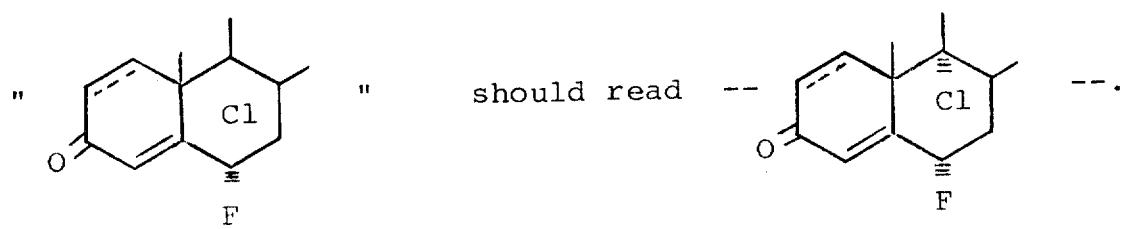

UNITED STATES PATENT OFFICE
CERTIFICATE OF CORRECTION

Patent No. 3,728,335          Dated April 17, 1973

Inventor(s)  Francisco S. Alvarez    (Page 2)

It is certified that error appears in the above-identified patent and that said Letters Patent are hereby corrected as shown below:

Column 7, line 34, "16α,17α-isopropyl-idenedioxy-" should read -- 16α,17α-isopropylidenedioxy- --. Column 7, line 44, "16α,17α1,4,9(11)-triene-" should read -- 16α,17α-isopropylidenedioxy-pregna-1,4,9(11)-triene- --. Column 10, line 1, "16α,17αisopropylidened" should read -- 16α,17α-isopropylidene- --. Column 10, line 2, "ioxy-pregna-" should read -- dioxy-pregna- --. Column 10, line 3, "6α-difluoro-" should read -- 6α,21-difluoro- --. Column 10, line 5, "16α,17-6O-cyclohexylidenedioxy-" should read -- 16α,17α-cyclohexylidenedioxy- --. Column 10, line 8, "pregny4-ene-" should read -- pregn-4-ene- --. Column 11, line 26, "9α,11η-dichloro-" should read -- 9α,11β-dichloro- --. Column 12, line 47, "6Oα-fluoro" should read -- 6α-fluoro --. Column 12, lines 49-55, that portion of formula III' reading:

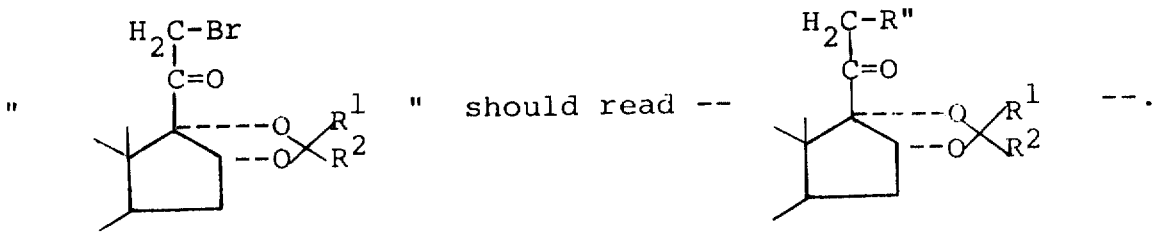

Column 12, lines 60-65, that portion of formula IIIa' reading:

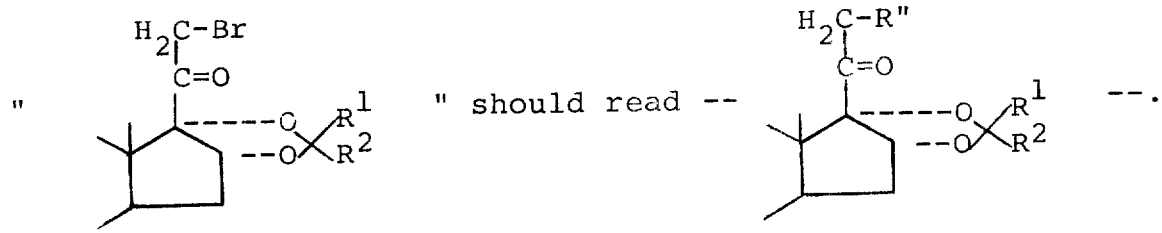

UNITED STATES PATENT OFFICE
CERTIFICATE OF CORRECTION

Patent No. 3,728,335              Dated April 17, 1973

Inventor(s) Francisco S. Alvarez     (Page 3)

It is certified that error appears in the above-identified patent and that said Letters Patent are hereby corrected as shown below:

Column 13, line 59, "claim 14" should read -- claim 11 --.
Column 14, lines 1-7, that portion of formula III' reading:

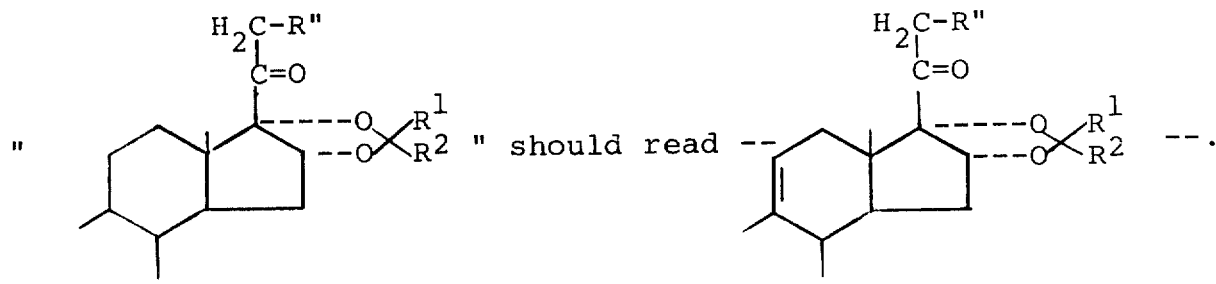

Column 14, line 13, "claim 14" should read -- claim 11 --.
Column 14, lines 23-33, that portion of formula (VI) reading:

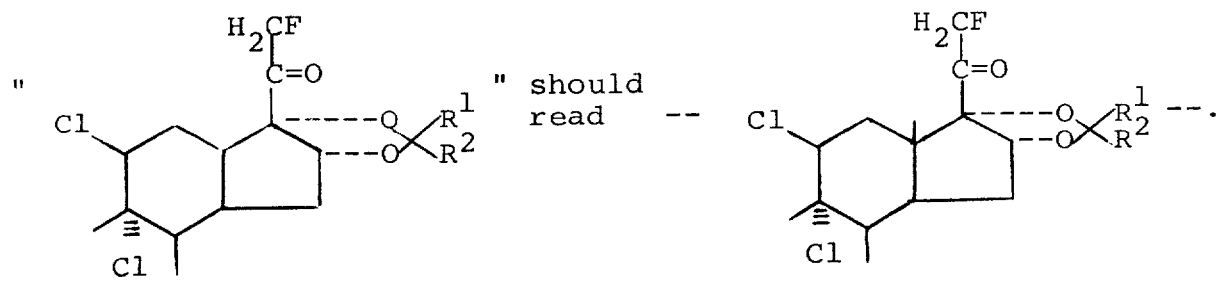

Column 14, line 36, "claim 14" should read -- claim 11 --.

UNITED STATES PATENT OFFICE
CERTIFICATE OF CORRECTION

Patent No. 3,728,335　　　　　Dated April 17, 1973

Inventor(s) Francisco S. Alvarez　　(Page 4)

It is certified that error appears in the above-identified patent and that said Letters Patent are hereby corrected as shown below:

Column 14, lines 39-45, that portion of formula III' reading:

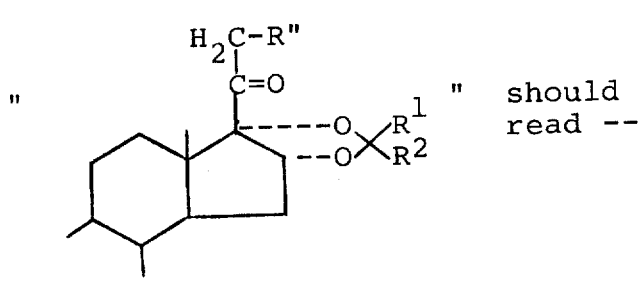 " should read -- 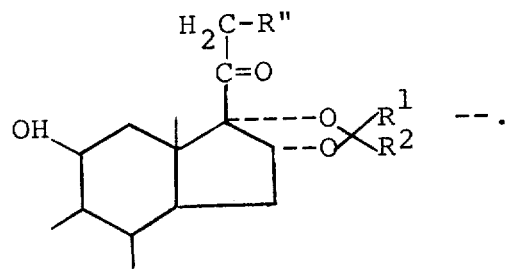 --.

Column 14, line 52, "claim 14" should read -- claim 11 --.

Signed and sealed this 17th day of September 1974.

(SEAL)
Attest:

McCOY M. GIBSON JR.　　　　　　　　　C. MARSHALL DANN
Attesting Officer　　　　　　　　　　Commissioner of Paten